United States Patent
Bailey et al.

(10) Patent No.: US 7,539,980 B1
(45) Date of Patent: May 26, 2009

(54) METHOD AND APPARATUS FOR CONCURRENCY TESTING WITHIN A MODEL-BASED TESTING ENVIRONMENT

(75) Inventors: Thomas Jack Geraint Bailey, Eastleigh (GB); Ian Derek Heritage, Eastleigh (GB); Michael Anthony Ricketts, Romsey (GB); James Clive Stewart, Evesham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,036

(22) Filed: Mar. 31, 2008

(51) Int. Cl.
*G06F 9/44* (2006.01)
*G06F 11/00* (2006.01)

(52) U.S. Cl. ............................ 717/135; 703/22; 714/38
(58) Field of Classification Search ..................... None
See application file for complete search history.

(56) References Cited

U.S. PATENT DOCUMENTS

| | | | |
|---|---|---|---|
| 5,513,315 A * | 4/1996 | Tierney et al. | 714/37 |
| 6,195,765 B1 * | 2/2001 | Kislanko et al. | 714/38 |
| 6,324,492 B1 | 11/2001 | Rowe | |
| 7,089,534 B2 | 8/2006 | Hartman | |
| 7,310,798 B1 * | 12/2007 | Gunara et al. | 717/135 |
| 2002/0069027 A1 | 6/2002 | Hapke | |
| 2002/0147942 A1 | 10/2002 | Moe et al. | |
| 2005/0086648 A1 * | 4/2005 | Andrews et al. | 717/135 |
| 2006/0129892 A1 | 6/2006 | Diaconu et al. | |
| 2008/0046791 A1 | 2/2008 | Bicheno et al. | |
| 2008/0271042 A1 * | 10/2008 | Musuvathi et al. | 718/108 |

* cited by examiner

*Primary Examiner*—Tuan Q Dam
*Assistant Examiner*—Michael J Yigdall
(74) *Attorney, Agent, or Firm*—Kenneth L. Sherman, Es; Michael Zarrabian, Esq; Myers Dawes Andras & Sherman, LLP

(57) ABSTRACT

A method and apparatus for concurrency testing within a model-based testing environment is provided. One implementation involves concurrency testing within a model-based software system testing environment, by receiving concurrent test service requests; duplicating a model representing software under test, based on the number of requests; sending the concurrent requests to each of the duplicated models sequentially but in different orders; storing the outcomes of each of the models; comparing the outcomes from the models to the outcome from the software system under test; and if all comparisons fail, then indicating test failure.

1 Claim, 2 Drawing Sheets

METHOD AND APPARATUS FOR CONCURRENCY TESTING WITHIN A MODEL-BASED TESTING ENVIRONMENT

BACKGROUND OF THE INVENTION

1. Field of the Invention

The present invention relates generally to code testing and in particular to code testing in a model-based testing system.

2. Background Information

Model-based testing works well in a single threaded environment where the order of operations is the same for both the model and the system under test. However, should a test be attempted using model-based testing in a multi-threaded environment, it becomes very difficult to ensure that the model still matches the system under test, and if they do not match, then is it valid that they do not match.

Further, the model and system under test may deal with requests in different orders due to their internal timing. For example if two requests (one to delete, and one to retrieve a document) arrive, the model may do the delete first and the retrieve subsequently, returning a "no document" or an exception. The system under test may execute the requests in the reverse order, returning the document, then deleting it. This type of mismatch is generally possible for any data or object modifying operations. Thus, there may be timing related mismatches between results from the model and the system under test and these will be reported as test failures.

Creating a model with the same timing as the system under test is not generally possible because the languages used to develop model and system under test are often different and the code paths in a model are generally far shorter than those in the real system under test.

SUMMARY OF THE INVENTION

A method and apparatus for concurrency testing within a model-based testing environment is provided. One implementation involves concurrency testing within a model-based software system testing environment, by receiving concurrent test service requests; duplicating a model representing software under test, based on the number of requests; sending the concurrent requests to each of the duplicated models sequentially but in different orders; storing the outcomes of each of the models; comparing the outcomes from the models to the outcome from the software system under test; and if all comparisons fail, then indicating test failure.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
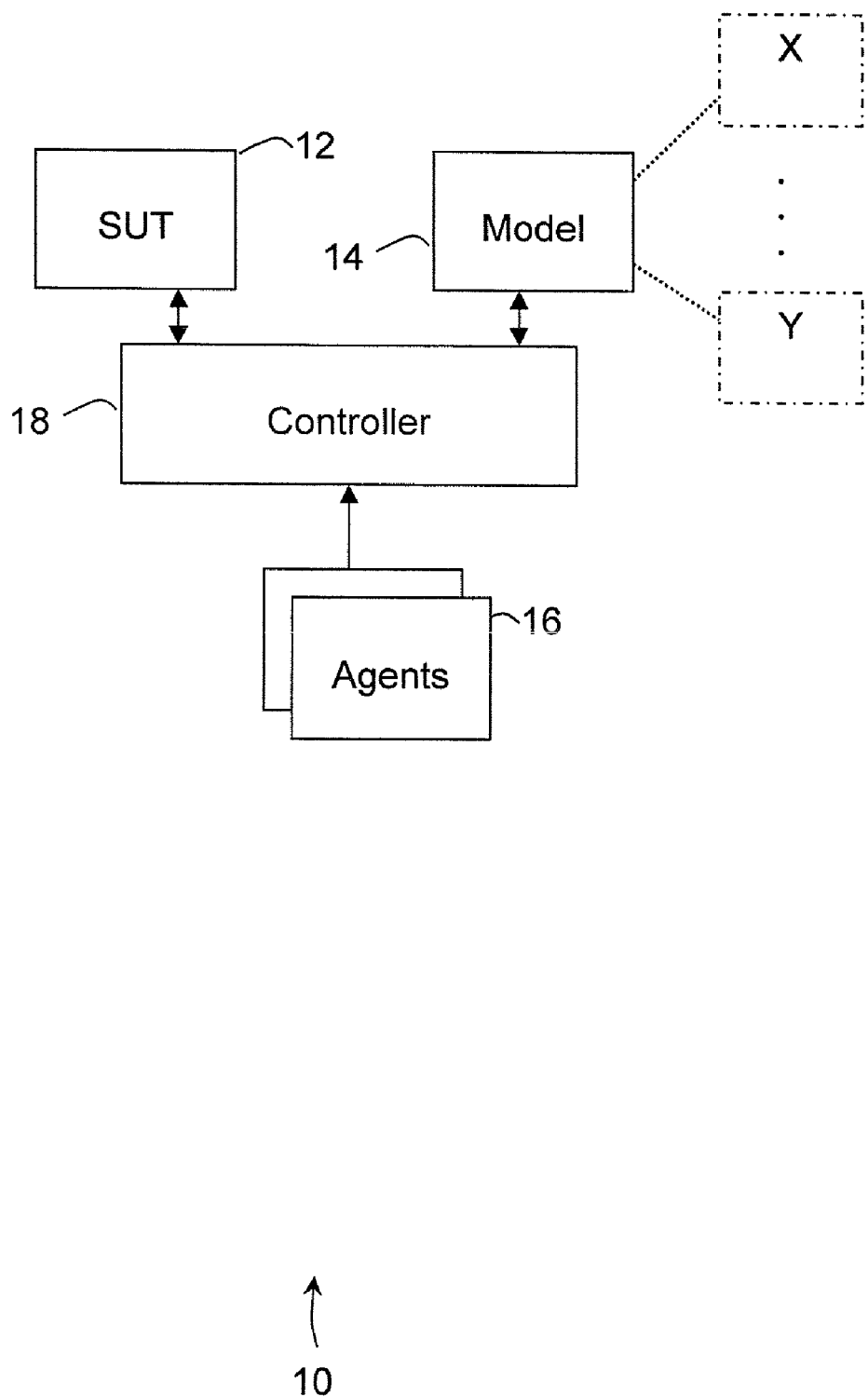
FIG. 1 shows a functional block diagram of a concurrency testing system within a model-based testing environment, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Model-based testing is software testing in which test cases are derived in whole, or in part, from a model that describes some (usually functional) aspects of the system under test (SUT). The invention provides a method and system for testing software code behavior with concurrent users, agents, or threads, using model-based techniques. One embodiment involves a process for concurrency testing within a model-based testing environment, by receiving concurrent test service requests; duplicating a model representing software under test, based on the number of requests; sending the concurrent requests to each of the duplicated models sequentially but in different orders; storing the outcomes of each of the models; comparing the outcomes from the models to the outcome from the software system under test; and if all comparisons fail, then indicating test failure.

An implementation is described below. When concurrent requests are serviced, the model is duplicated. The concurrent requests are then sent to each of the duplicated models sequentially but in different orders. The outcomes of each of the models is stored and compared to the outcome from the system under test.

Should the outcome of the system under test not match any of the model outcomes then the test fails. Should the outcome of the system under test match one of the models, then the test is deemed a success and the model based testing continues, using the model that had the outcome that matched the system under test. Should the outcome of the system under test match more than one of the models, then the test is deemed a success and the model based testing continues. However, before deciding on which model to use to continue the testing, a full comparison using the models whose outcomes matched the outcomes of the system under test is run against the system under test. The model that actually matches the system under test would then be used. Should more than one of the models match the system under test then any of them can be used to continue testing. The testing continues with the model selected because this will have the correct state representation of the system under test. Should any concurrent requests be received after this process has completed then the process is repeated using the model selected previously as the basis of any subsequent duplication.

For a better understating of the invention, first a conventional non-concurrent scenario with one rule based agent is described, and then a concurrent scenario according to the invention is described. In the conventional scenario, an action A is sent to the SUT, which in turn responds with a result X1. The same action A is then sent to the model which responds with a result X2. The results from the SUT and the model are compared as:

If X1=X2 then testing continues.

If X1#X2 then the controller halts the testing and reports a failure.

However, such non-concurrent model-based testing does not function for concurrency testing. By concurrency it is meant that action B is sent to the SUT while action A is still being processed (has not returned).

A concurrent test scenario according to an embodiment of the invention is now described. FIG. 1 shows a functional block diagram of a testing system 10 implementing aspects of the invention. The system 10 includes the system under test (SUT) 12, a model 14 (e.g., Oracle) of the system under test, one or more rule based agents 16 and a controller 18. The rule based agents 16 attempt to call actions (methods) on the controller 18. The controller 18 sends the action firstly to the SUT 12, and after a response, the controller 18 sends the action to the model 14. The controller 18 then compares the outcomes from the model and the SUT, and should the outcomes match, then the testing continues. Should the outcomes not match then the testing ends with a failure.

More than one rule based agent 16 is used to represent multiple users/client applications. A first agent 16 (Agent 1) sends action A to the controller 18. The controller 18 forwards the action A onto the SUT 12. A second agent 16 (Agent 2) sends action B to the controller 18. The controller 18 forwards this action onto the SUT 12 before action A has returned results from the SUT 12. This constitutes a concurrent request. The rule based agents may send their actions to the controller at exactly the same time, and the actions will be forwarded to the SUT in the same manner. As such, the order in which the forward actions are processed by the SUT 12 is unpredictable.

The controller will not send the actions to the model 14 until all concurrent actions have been returned from the SUT 12. If another rule based agent (e.g., Agent 7) sends action C to the controller before actions A or B have returned from the SUT 12, the action C will also be included in the concurrent test list.

Once all concurrent actions have been returned from the SUT 12 (e.g., actions A and B), then the controller 18 forwards the actions to the model 14. In this example, the controller 18 has two responses from the model 14, one for action A (response A) and one for action B (response B). The controller 18 duplicates the current model state equal to the number of actions (e.g., 2 in this example as model X and model Y). The controller sends action A to Model X which returns response Xa. The controller also sends action B to Model Y which returns response Yb.

The controller then compares response A from the SUT to response Xa from model X. If they match, then model X is kept "active", otherwise it is moved to an "inactive" state. The controller also compares response B from the SUT to response Yb from model Y. If they match, then model Y is kept "active", otherwise it is moved to an "inactive" state. As such, there are four possible outcomes:

1. Models X and Y are both " active".
2. Model X is "active" and model Y is "inactive".
3. Model X is "inactive" and model Y is "active".
4. Models X and Y are both "inactive".

If both models X and Y are deemed "inactive", then the test has failed. The controller 18 halts the testing and reports a failure. In all other cases, at least one model is still "active". To take the most complex scenario, we assume outcome number 4 where both models are still active, such that the next action is sent from the controller 18 to the relative models under test (if outcomes 2 or 3 above were realized, then only the active model is considered for the remainder of the test):

Controller sends action B to Model X which returns a response Xb.
Controller sends action A to Model Y which returns a response Ya.

The controller then compares response B from the SUT to response Xb from model X. If they match, then model X is kept "active", otherwise it is moved to an "inactive" state. The controller also compares response A from the SUT to response Ya from model Y. If they match, then model Y is kept "active", otherwise it is moved to an "inactive" state. The same four outcomes are possible as described earlier. If both models are deemed "inactive" then the test has failed. The controller halts the testing and reports a failure. In all other cases at least one model is still "active" (if outcomes 2 or 3 are realized then a single remaining active model is considered as the one which matched the SUT and is used for any further requests/actions from the rule based agents). This test is deemed a success.

If both models are "active" then there are two courses of action, depending on the system being modeled. It can be assumed that the actions performed on the SUT were independent and therefore both models are accurate representations of the SUT. Only one of the models will be used for any further requests/actions from the rule based agents 16. This test is deemed a success. In the case of a more complex system, where actions/requests may cause side-effects, then the state of the SUT 12 needs to be compared with the model. The controller 18 compares the state of the first model with the state of the SUT. If the two states are the same, the first model is deemed correct and is used for any further requests/actions from the rule based agents 16. This test is deemed a success. Otherwise, if said two states are not the same, then the second model is compared and so forth. If no models have the same state as the SUT, then the test has failed. The controller halts the testing and reports a failure.

Figure 2:
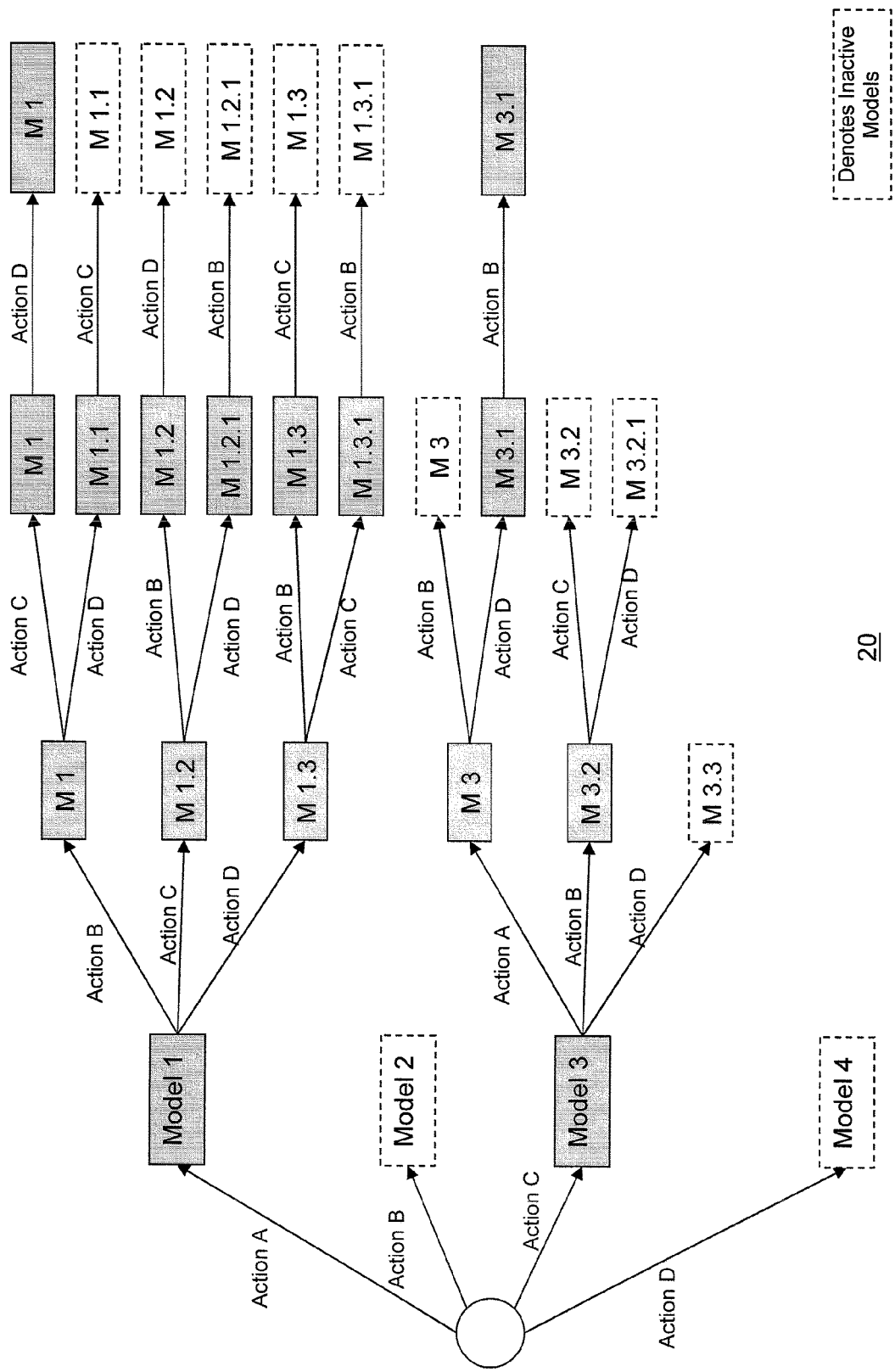
FIG. 2 shows an example process for concurrency testing for a model-based testing system, according to an embodiment of the invention.

The above process may be applied to n concurrent actions. In this case n duplicate models are created. For each model which is kept "active", n-1 models are created. The process then repeats on this model with n-1 actions. FIG. 2 shows an example concurrent process 20 for n=4 concurrent actions/requests (A, B, C and D) based on the above description, according to an embodiment of the invention. As shown in FIG. 2, only 13 model states are required according to the invention, as opposed to 24(4!) if a model was created for each possible ordering of the actions.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for concurrency testing within a model-based software system testing environment, comprising:

receiving concurrent test service requests;

sending the concurrent requests to a software system under test for execution on a processor;

duplicating a model representing the software system under test, based on the number of requests, such that the number of duplicated models is the same as the number of concurrent test service requests;

sending the concurrent requests to each of the duplicated models sequentially but in different orders;

storing the outcomes of each of the duplicated models;

comparing the outcomes from the duplicated models to the outcome from the software system under test; and if all comparisons fail, then indicating test failure.

* * * * *